United States Patent Office 3,157,970
Patented Nov. 24, 1964

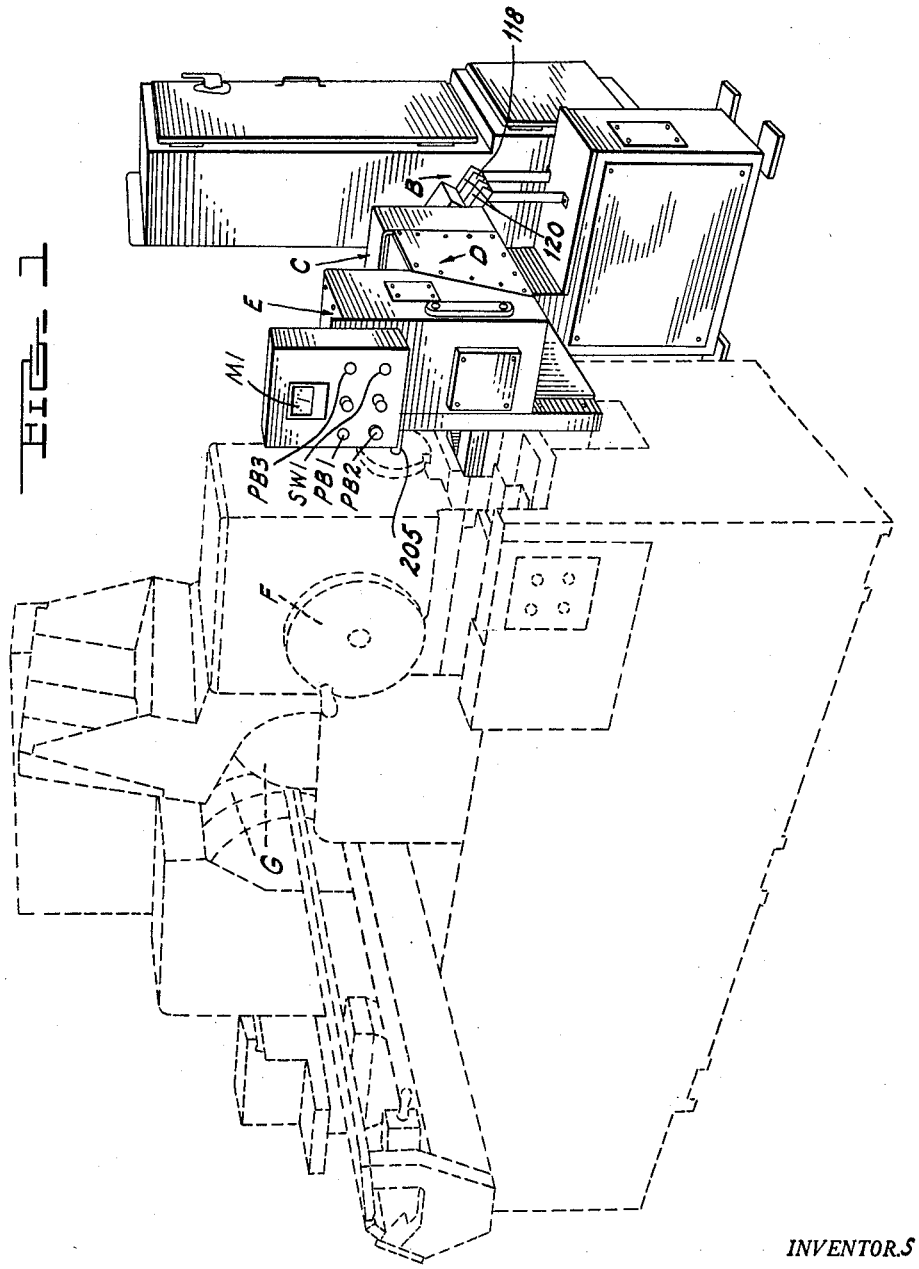

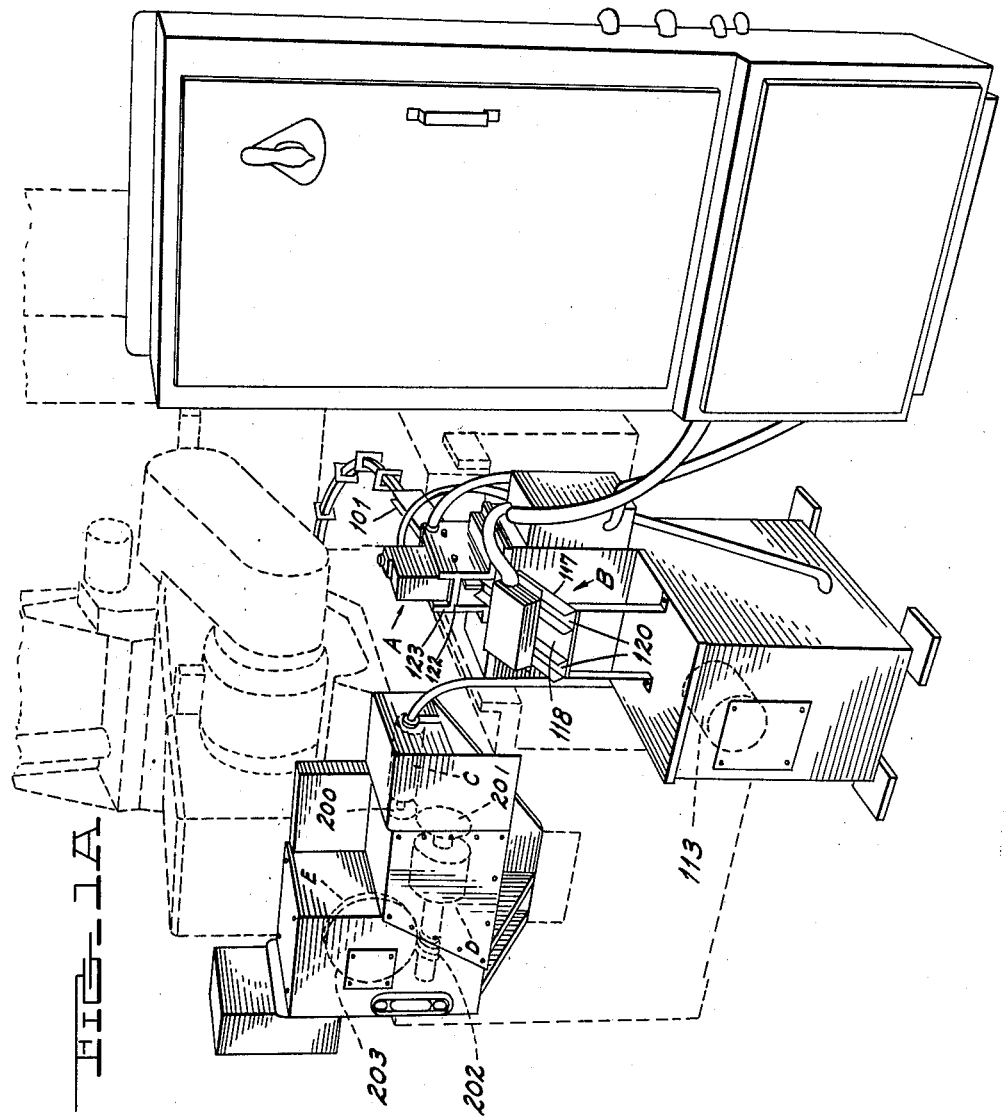

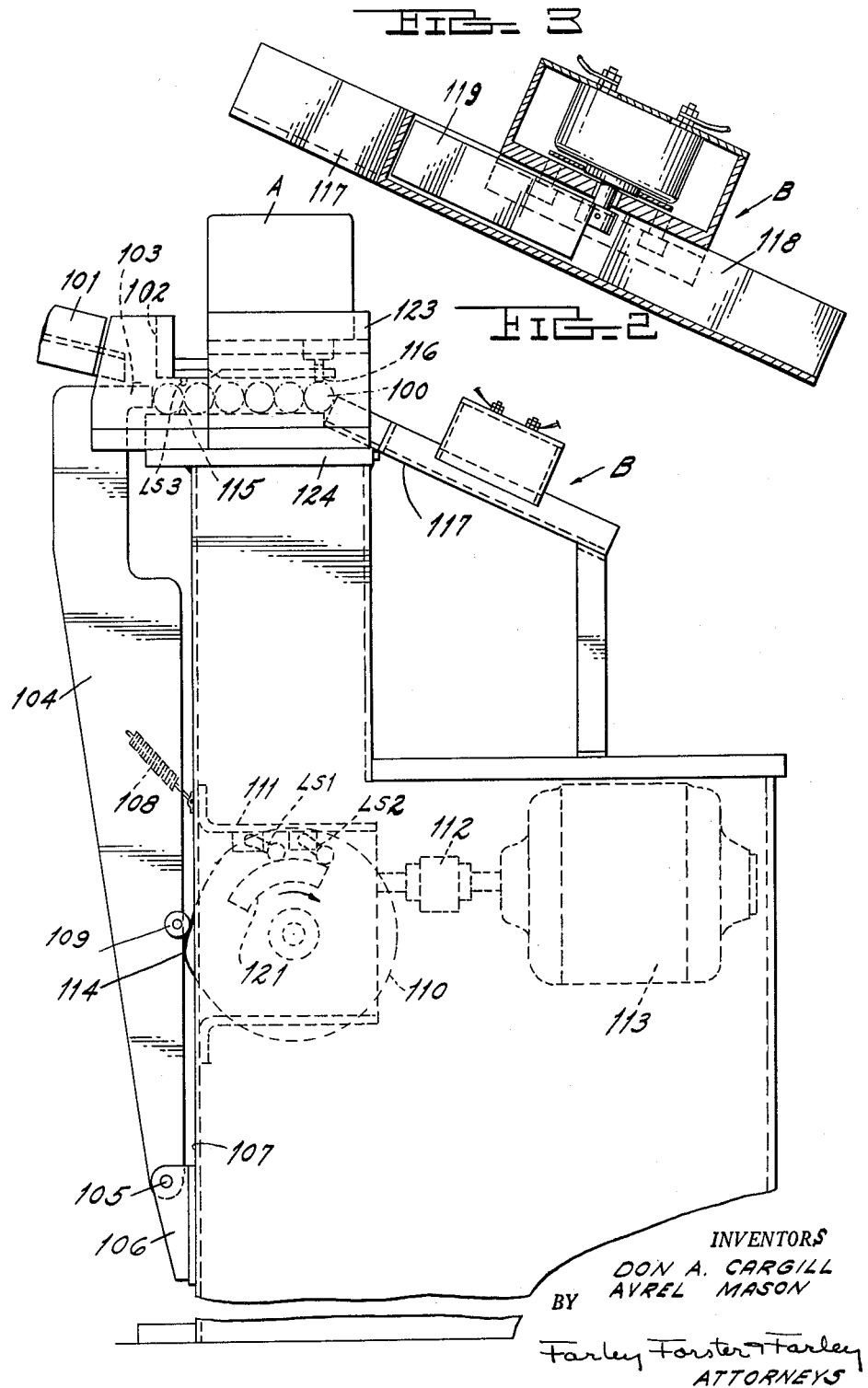

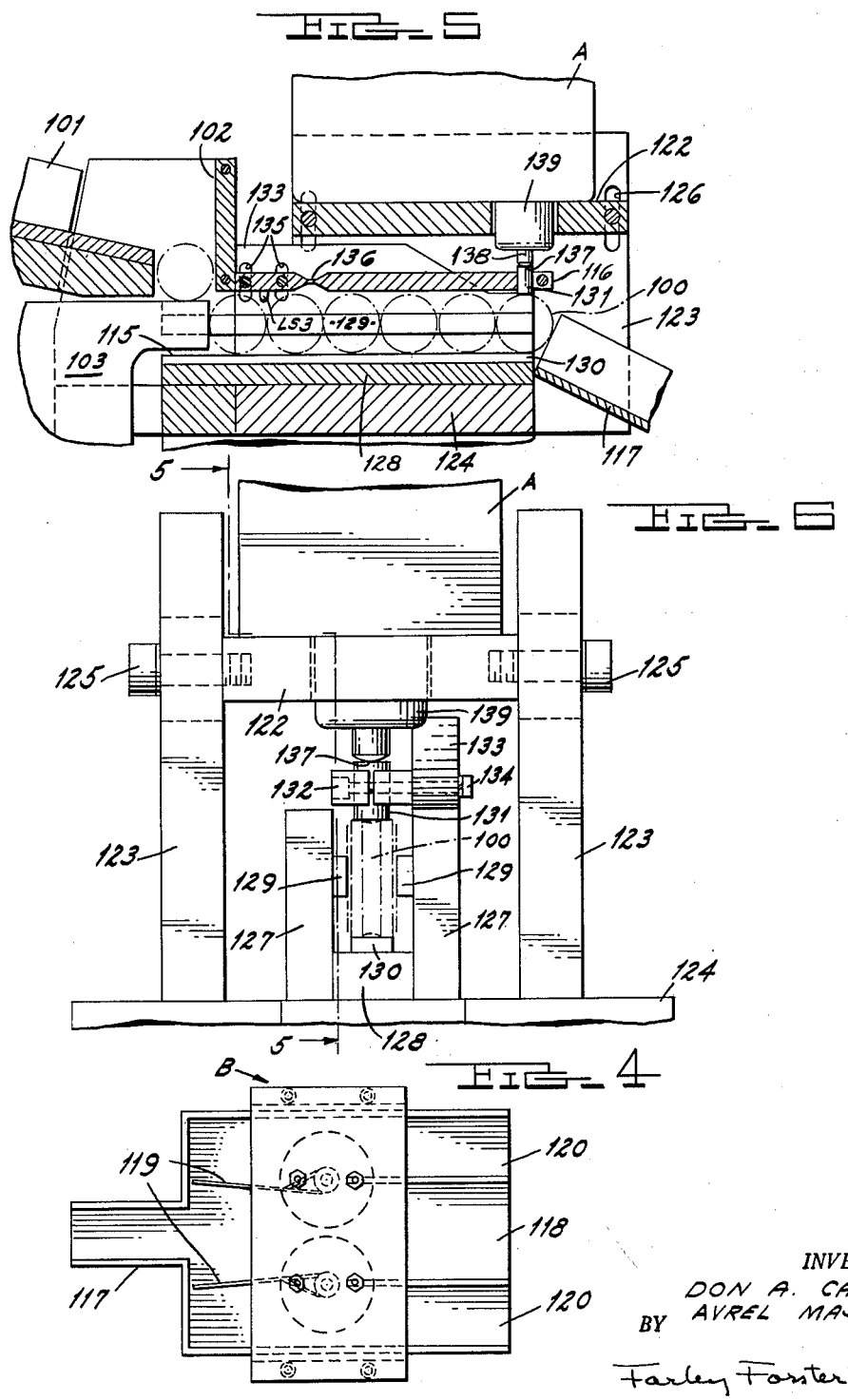

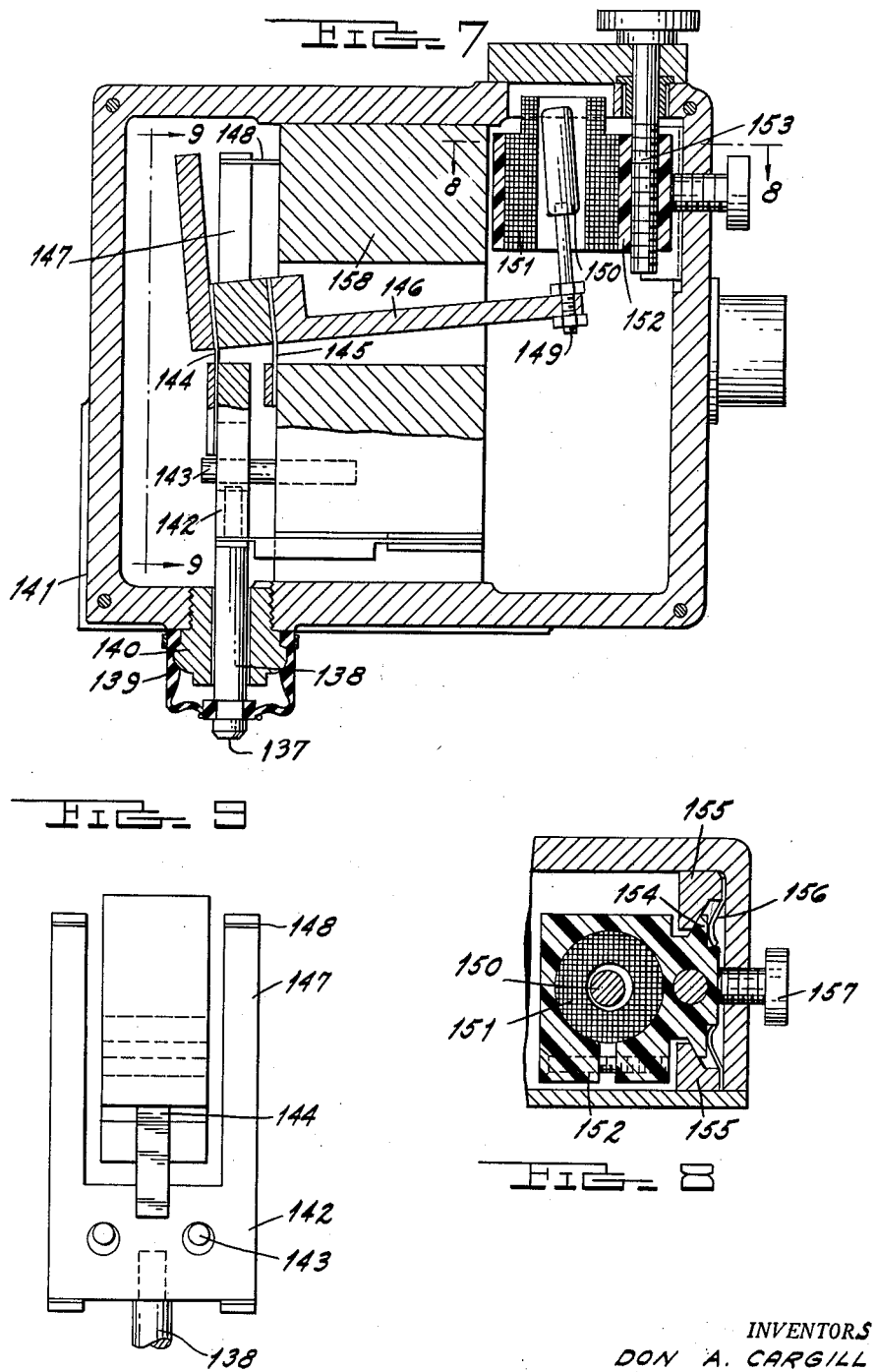

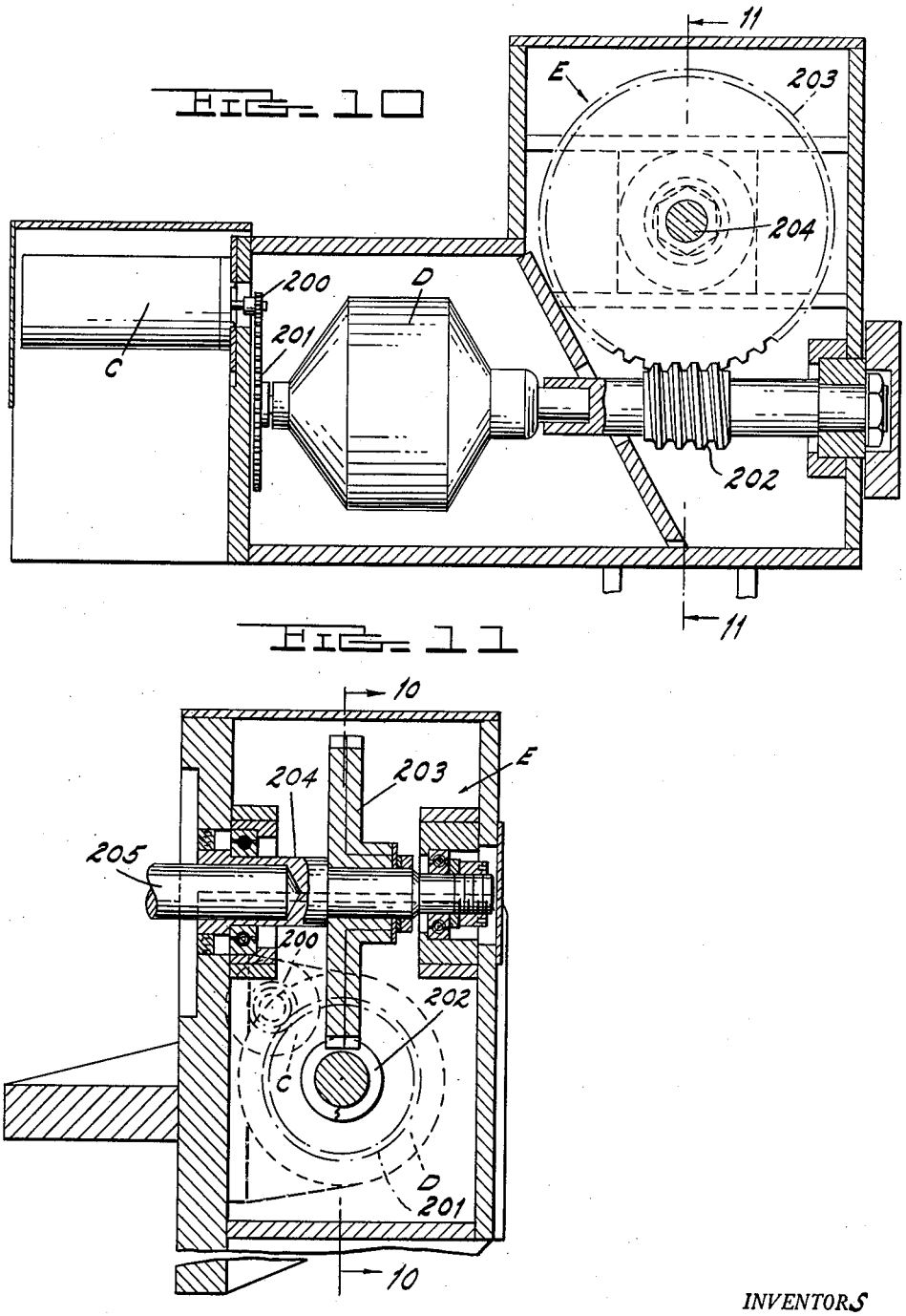

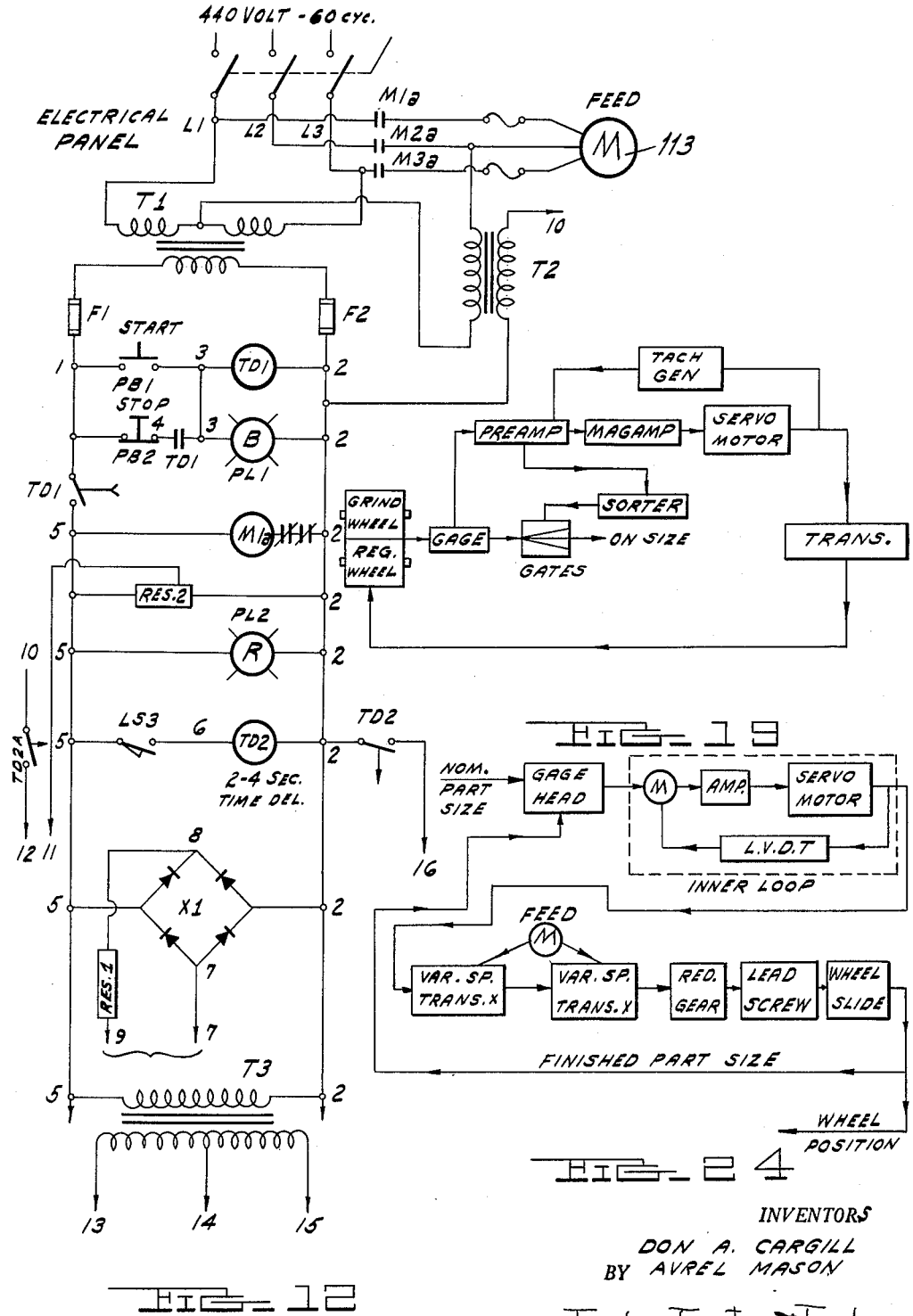

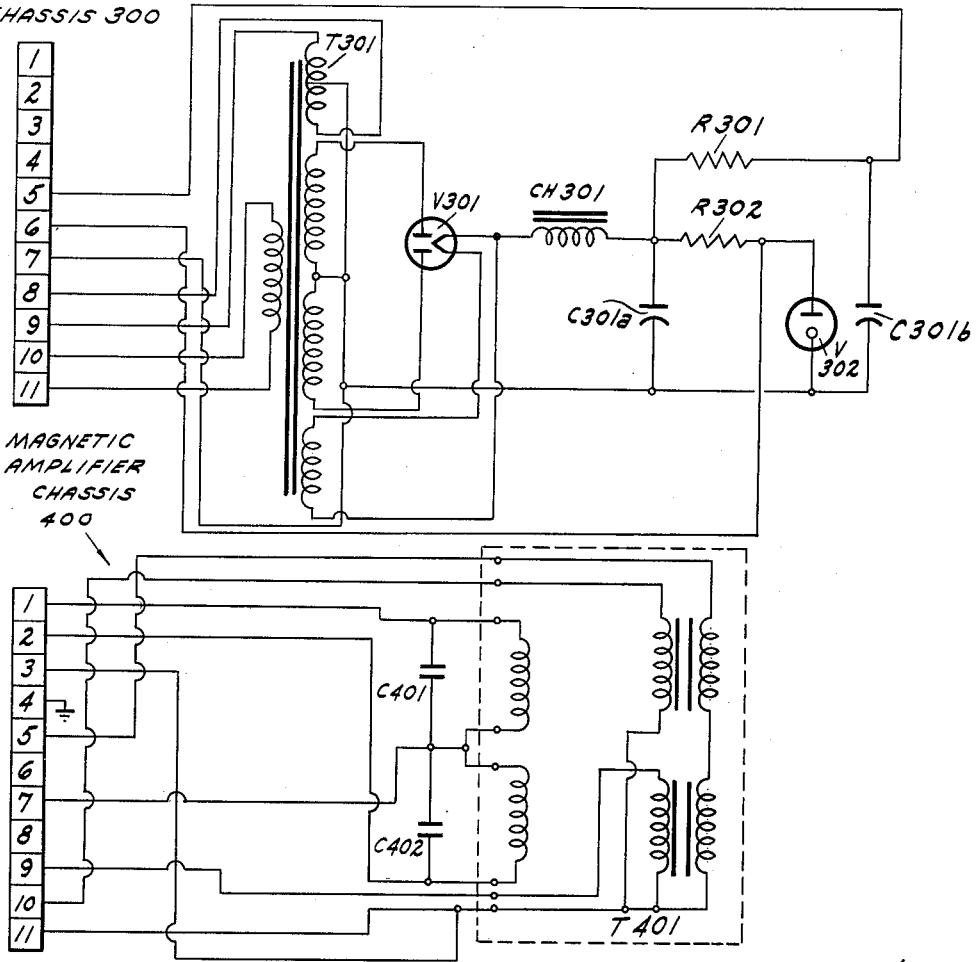
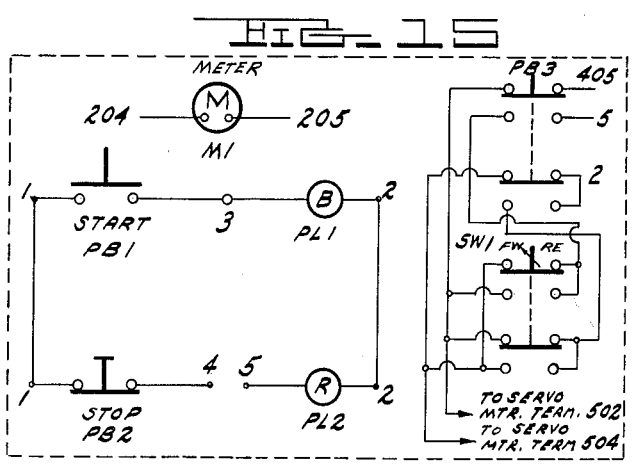

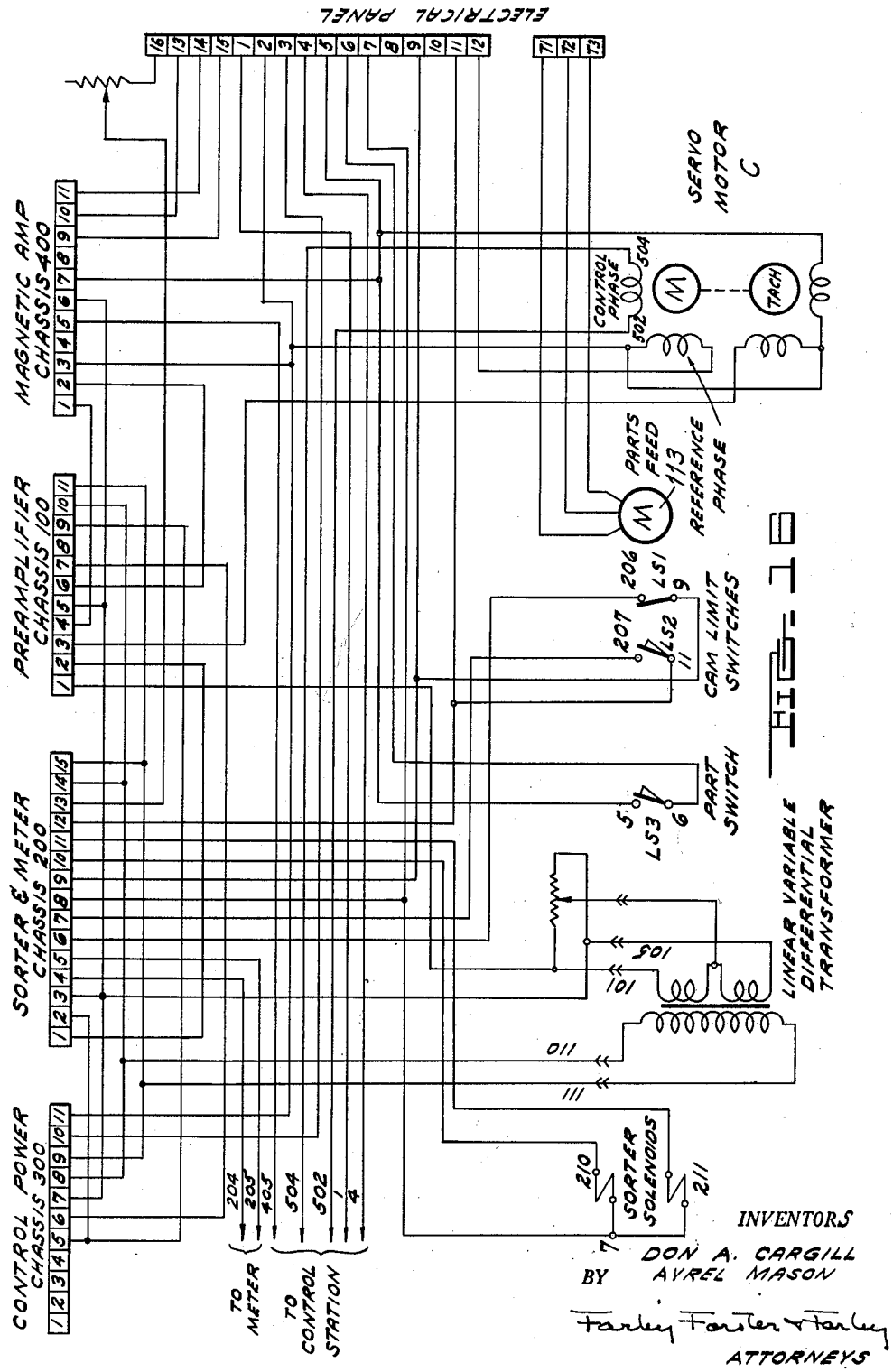

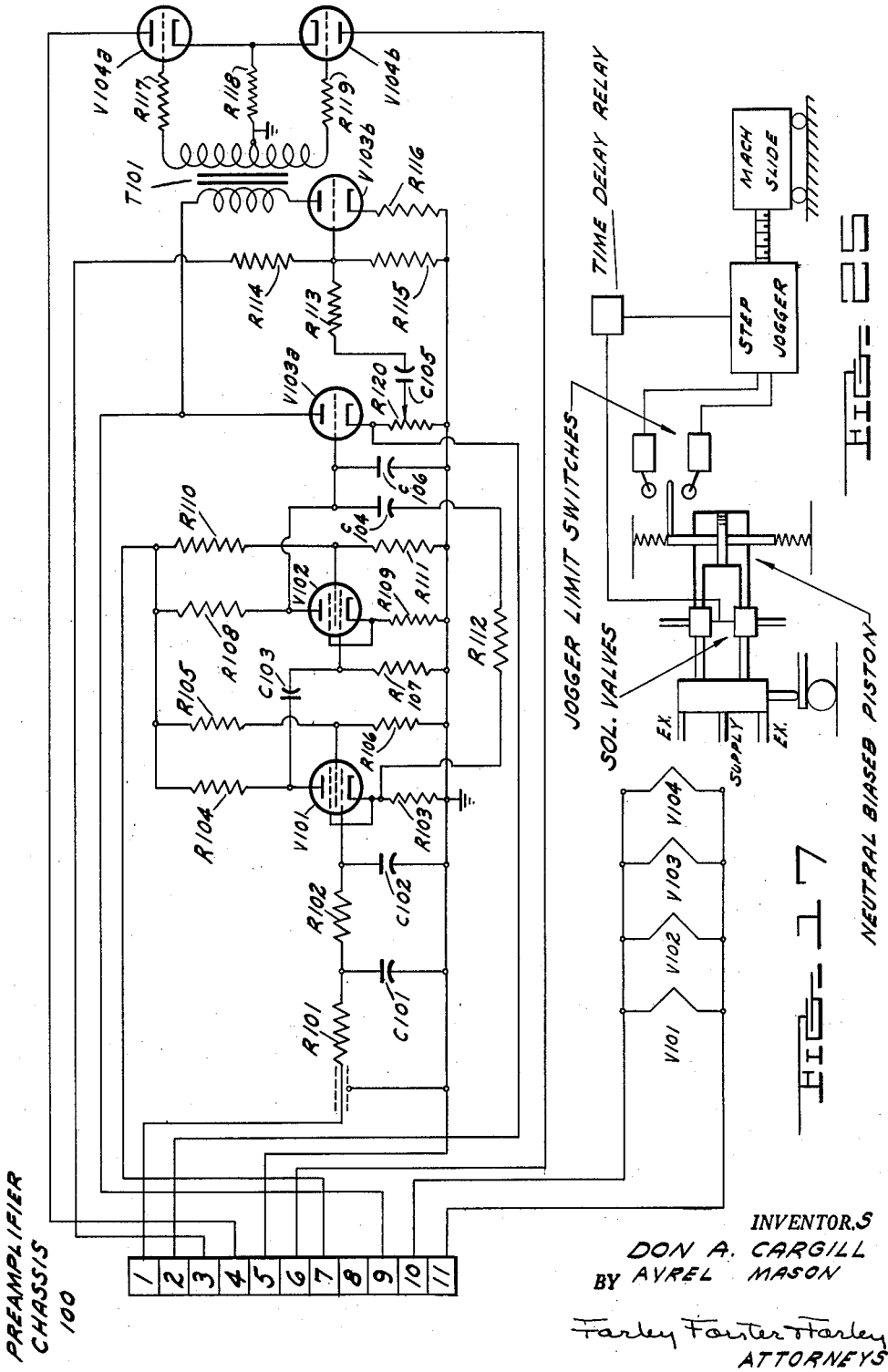

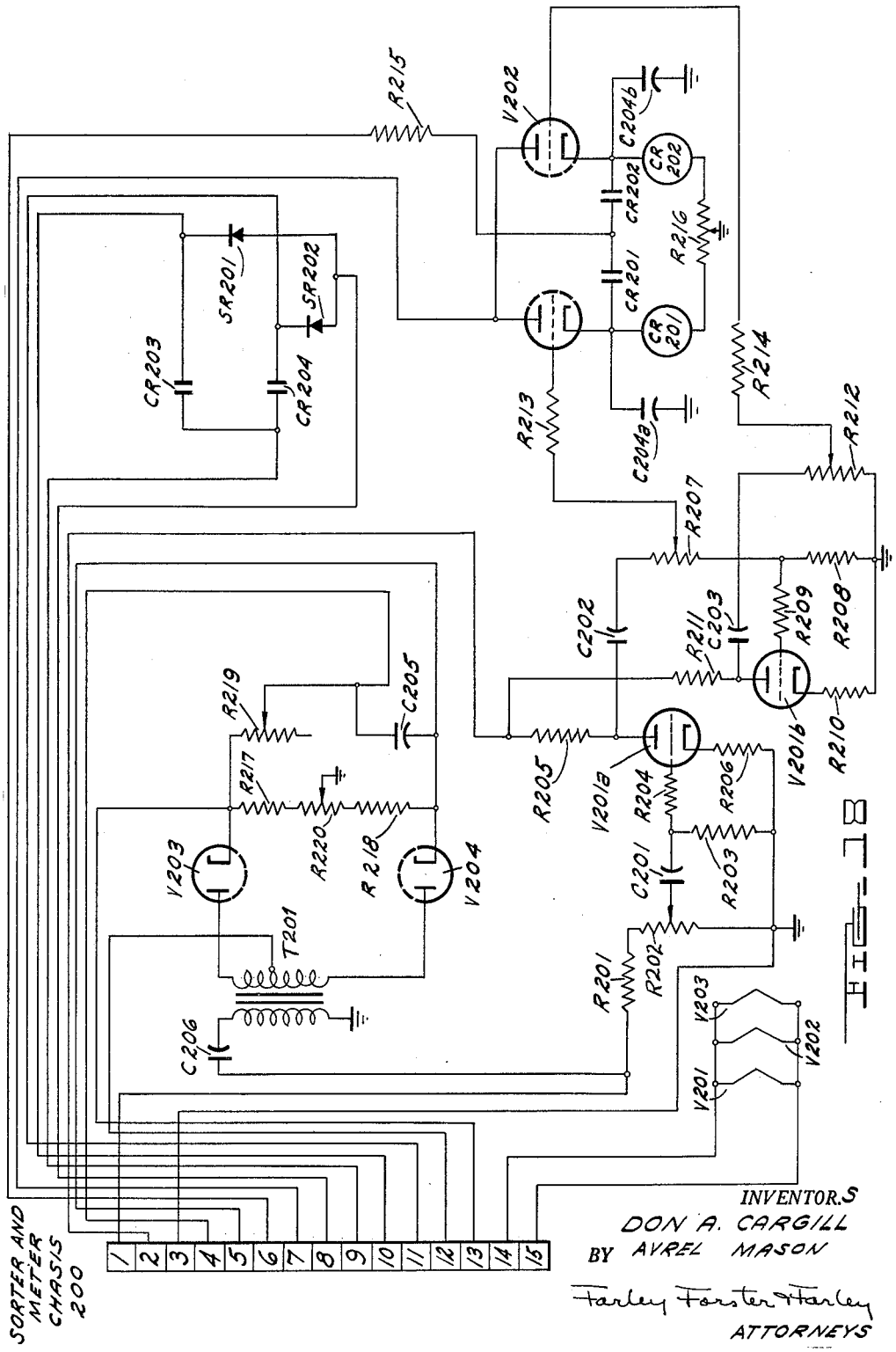

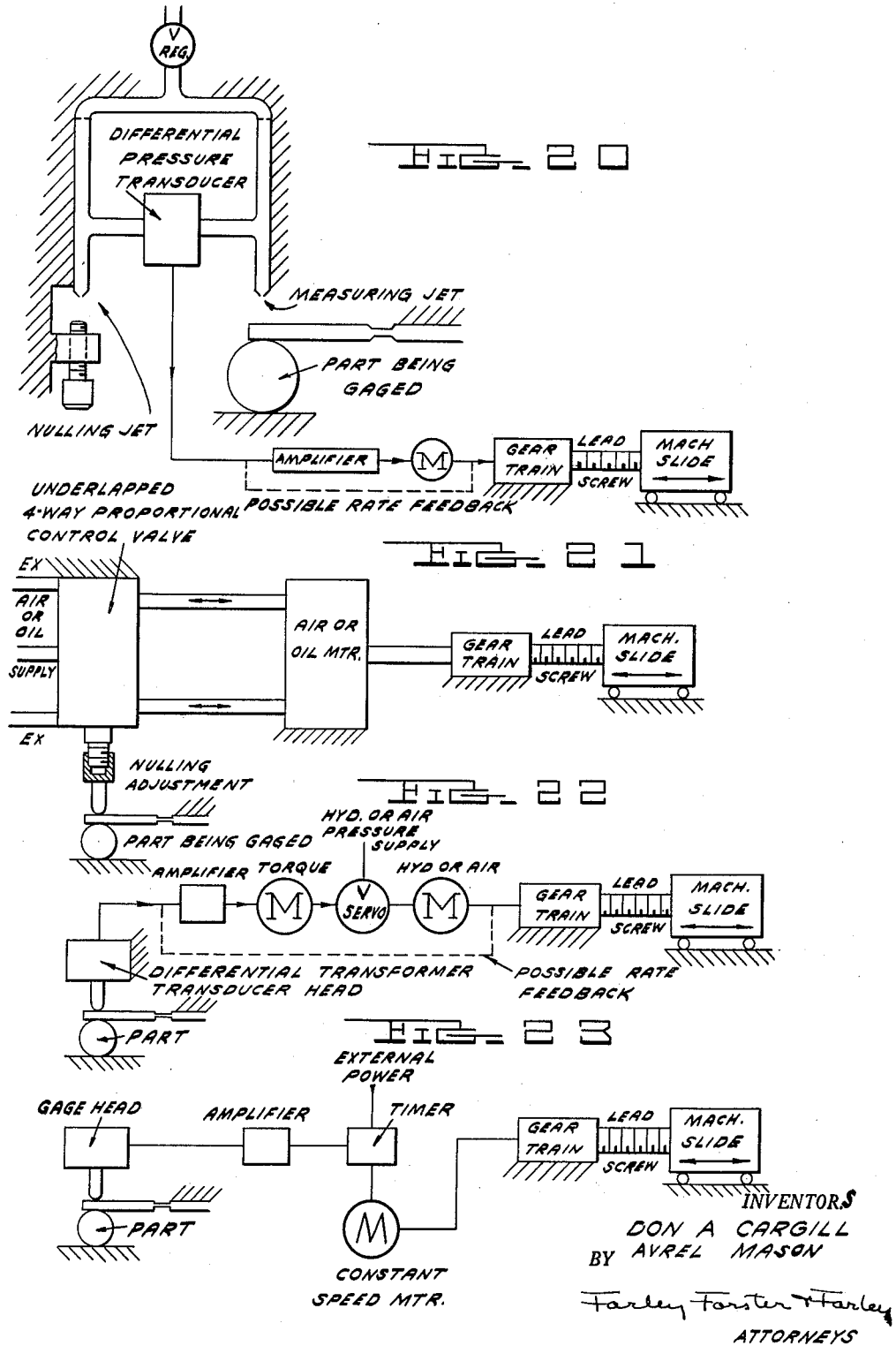

3,157,970
GRINDER CONTROL
Don A. Cargill, Birmingham, Mich., and Avrel Mason, Moorestown, N.J., assignors to Cargill-Detroit Corporation, Clawson, Mich., a corporation of Michigan
Continuation of application Ser. No. 554,825, Dec. 22, 1955. This application Nov. 7, 1962, Ser. No. 236,766
19 Claims. (Cl. 51—165)

This invention relates to an automatic part size control system for a production machine such as a grinder wherein wheel wear and other factors tend to produce deviation of part size during a production run.

The present application is a continuation of our copending application Serial No. 554,825, filed on December 22, 1955, expressly abandoned upon the filing of the present application.

One embodiment disclosed in detail herein is applied to a centerless grinder having an adjustable wheel slide for varying part size. Outcoming parts pass through a gauging mechanism which is preset for a nominal part size. Mechanical linkage directly actuated by successive parts passing under the gauge head positions the core of a linear variable differential transformer adapted to produce a differential voltage signal proportional to any deviation of part size from nominal. Such voltage signal has a different phase depending on whether the part is oversize or undersize and is suitably amplified and applied to the control winding of a reversible two-phase motor which is adapted through suitable reduction gearing to drive the adjustment feed screw for adjusting the grinder wheel slide, the direction and magnitude of the adjustment being dependent upon and proportional to the phase and magnitude of the differential transformer voltage signal. A tachometer generator directly driven by the servo motor produces a feedback to the amplifying system in order to stabilize and dampen the motor drive when the demand of the control signal is met.

The differential transformer voltage is also adapted to control an automatic sorter in accordance with pre-determined oversize and undersize limits as well as to control a visual meter accurately indicating the size of parts passing through the gauging mechanism.

Any grinding machine which is run continuously without adjustment will produce parts which have an *average* size following a curve corresponding to wheel wear. Individual part sizes will fall on either side of such curve due to factors other than wheel wear causing variations in part size. The limits of such "scatter" band will be defined by infrequent parts deviating substantially from the average curve while progressively larger numbers of parts will have sizes approaching the average curve. The present control is directed to sense and produce an energy signal in response to any deviations from a nominal size, and to apply such energy signal to means for effecting adjustment in response thereto, rather than to sense and/or produce an adjustment only when a part exceeds a pre-determined deviation tolerance as is typical of prior automatic part size controls. In the embodiment of the present control discussed above, neither the differential transformer for producing the energy signal nor the two-phase servo motor for effecting adjustment in response thereto is subject to any pre-determined established limit of sensitivity and accordingly all part deviations tend to contribute to adjustment of the machine. In addition, the present control is directed to produce an energy signal proportional to the magnitude of part deviation from the pre-determined nominal size and to produce adjustment proportional to the magnitude of the energy signal, rather than to produce adjustment in pre-established fixed "jogging" steps as in prior controls.

The present control is also adapted to produce a *continuous* energy signal and *continuous* adjustment responsive thereto rather than to produce only intermittent "jogging" adjustment steps. These factors contribute to a control which maintains the average part size line substantially on the pre-determined nominal part size and with deviations substantially limited to the "scatter" band of the grinder. It is inherently impossible for a control which produces fixed increment adjustments responsive only to occasional parts which exceed a pre-determined established tolerance limit to accomplish the same order of accuracy of size control.

The disclosed embodiment is adapted to move parts successively into the gauging mechanism with an intermittent feed mechanism cycling at a rate slightly exceeding the production rate of the grinder and each part remains under the gauge for approximately 80 to 90 percent of each feed cycle. A continuous energy signal is produced during such predominant dwell period together with continuous adjustment proportional to such energy signal. The relatively short intermittent period between parts when the gauging mechanism registers undersize is not sufficient to require interruption of the energy signal for most applications particularly where, as in the present case, an upper limit on the effective rate of adjustment, corresponding for example to a .0005 offsize part condition, is provided. Such limit is also desirable so that the control will not be unduly influenced by occasional grossly offsize parts arising from unusual circumstances which are not representative of the main production run of parts.

The present control system is preferably arranged to permit initial setting or an overriding adjustment at any time through a direct manual feed of the wheel slide and also to permit accelerated adjustment through the control servo motor in either forward or reverse direction by a jogging control button which provides the control winding of the servo motor with a large voltage for high speed operation.

A timer control is provided to interrupt the automatic adjustment circuit at any time that normal part flow from the grinder is interrupted thus preventing unwanted continuing adjustment during any period of production stoppage.

The embodiment disclosed in detail herein provides what may be termed a "velocity" system wherein automatic adjustment occurs in response and at a rate proportional to part size deviation and wherein no adjustment occurs in response to an exactly onsize part. However, since wheel wear occurs during the production of onsize parts, it may be desirable in some cases to incorporate a bias in the adjustment speed corresponding to the average rate of wheel wear so that even during the gauging of exactly onsize parts an adjustment will take place corresponding to the average rate of wheel wear. Such bias may be incorporated by adjustment of the differential transformer in the gauging mechanism so that a slightly bias voltage signal is produced during the gauging of exactly onsize parts sufficient to produce an adjustment speed corresponding to the average rate of wheel wear.

A further refinement of this system may be employed to effect an even more theoretically perfect "acceleration" system of control wherein the servo motor is driven at a rate which is progressively adjusted in accordance with cumulative effect of prior size deviations. In such system, the previously established rate of adjustment remains effective during the gauging of exactly onsize parts. Such "acceleration" system will automatically provide a bias feed continuously adjusted to compensate for higher rates of wheel wear as the wheel diameter grows smaller thus providing an optimum accuracy of control.

The present system is applicable to various types of grinders as well as other precision machines involving a wearing tool element. For example, it is equally applicable to an infeed type of grinder wherein the grinder wheel is advanced for each part to a position established by a positive stop, the automatic adjustment in such case being applied to the positive stop rather than the grinder wheel slide. Again, in cases where effective grinder wheel position is established by step advance and automatic dressing operations, adjustment in the position of the dressing tool to compensate for its wear may be effected under the control of the present system. The system is likewise applicable to any phase of through feeding between progressive grinding operations.

While the preferred embodiments of the present system employ a continuously variable speed adjustment, as by two-phase servo motor having a speed proportional to the excitation of the control winding, a modified form of the system may be employed wherein a fixed speed adjustment drive motor is used which may be clutched into effective drive engagement for different successive periods of time depending on part size deviation, the magnitude of the gauge responsive energy signal in such case being employed to control a variable timer.

From the above brief description, it will be understood that one object of the present invention is to provide an automatic part size control system which utilizes information from all part size deviations in effecting automatic adjustment as distinguished from a system wherein only parts exceeding a pre-determined established deviation are effective in producing adjustment.

Another object is to employ a gauging means in such system which will produce an energy signal increasing in magnitude with deviation from nominal part size together with means for effecting adjustment increasing in magnitude with the value of the energy signal.

Another object is to employ a differential part size deviation energy signal which distinguishes between oversize and undersize parts together with reversible means for effecting adjustment depending upon the direction of the part size deviation.

Another object is to employ a continuous energy signal to control a continuous adjustment varying with the magnitude of part size deviation.

Another object is to provide suitable means for amplifying a differential energy signal in order to provide a high order of response sensitivity in effecting control adjustment.

Another object is to provide upper and lower limits for the rate of adjustment in order to avoid undue control effects from grossly oversize or undersize parts which are not representative to the production run.

Another object is to provide means for biasing the control to provide a normal speed corresponding to average rate of wheel wear.

Another object is to provide a modified acceleration system wherein a continuing rate of adjustment is established and progressively modified by part size deviation.

Another object is to employ a modified system wherein a standard rate of adjustment is applied for a variable time controlled by deviation of part size.

Another object is to adapt a differential transformer responsive to part size deviation to provide a voltage signal increasing in magnitude with part size deviation and having distinguishable phases for oversize and undersize deviation.

Another object is to provide a suitable amplifying system for converting such energy signal to control an adequate source of power for effecting highly sensitive responsive adjustments.

Another object is to adapt a two-phase servo motor to effect adjustments through suitable reduction gearing.

Another object is to employ a differential energy signal increasing in magnitude with part size deviation for effecting an automatic sorting operation for completed parts.

Another object is to employ such energy signal to control an accurate visual gauge for continuously indicating the size of parts produced by the machine.

Another object is to employ control means wherein a manual feed may be superimposed on the automatic control feed.

Another object is to provide means for utilizing the servo motor of the control system for effecting relatively fast forward or reverse manual adjustments.

Another object is to provide means for stopping any control adjustment in response to interruption in the normal flow of production parts from the machine.

These and other objects will be more apparent from the following detailed description of a particular embodiment and a number of modifications as illustrated in the accompanying drawings wherein:

FIG. 1 is a perspective view of the control system applied to a conventional precision centerless grinder;

FIG. 1a is another perspective view of such control system showing the inter-relation of the various principal mechanical components;

FIG. 2 is a side elevation of the part feeding, gauging and sorting mechanism;

FIG. 3 is an enlarged sectional view of the sorting mechanism shown in FIG. 2;

FIG. 4 is a plan view of such sorting mechanism;

FIG. 5 is an enlarged sectional side elevation of the gauging mechanism shown in FIG. 2 taken along the line 5—5 of FIG. 6;

FIG. 6 is an end elevation of such gauging mechanism;

FIG. 7 is an enlarged sectional side elevation of the gauge head proper showing amplifying mechanical linkage and the differential transformer employed therein;

FIG. 8 is a sectional plan view taken along the line 8—8 of FIG. 7;

FIG. 9 is an end elevation taken along the line 9—9 of FIG. 7;

FIG. 10 is a sectional end elevation of the servo motor and reduction gearing shown in FIG. 1a;

FIG. 11 is a sectional view taken along the line 11—11 of FIG. 10;

FIG. 12 is a schematic electrical diagram;

FIG. 13 is a schematic diagram of the electrical control power circuit;

FIG. 14 is a schematic diagram of the magnetic amplifier circuit;

FIG. 15 is a schematic diagram of the manual control panel;

FIG. 16 is a schematic diagram showing the inter-connections between the various electronic circuits;

FIG. 17 is a schematic diagram of the pre-amplifier circuit;

FIG. 18 is a schematic diagram of the sorter and meter circuit;

FIG. 19 is a schematic diagram of the control system disclosed in detail in the previous figures;

FIG. 20 is a schematic diagram of a modified form of the present control system employing differential fluid pressure jet gauging mechanism;

FIG. 21 is a schematic diagram of a further modified form of the present control system employing differential fluid pressure valve gauging mechanism for controlling a fluid pressure motor adapted to effect control adjustments;

FIG. 22 is a schematic diagram of a further modified form of the present control system employing an electrical energy signal to control a fluid pressure adjustment motor;

FIG. 23 is a schematic diagram of a further modified form of the present control system employing a constant speed motor and variable timer for controlling drive engagement of such motor;

FIG. 24 is a schematic diagram of a further modified form of the present control system adapted to provide "acceleration" servo control characteristics; and FIG. 25 is a schematic diagram of a further modified form of the present control system applied to a step jogging adjustment drive.

Referring to FIGS. 1 and 1a, completed parts discharged from a centerless grinder pass through gauging mechanism A and sorter B. Servo motor C responsive to the gauging mechanism drives through differential planetary reduction gearing D and worm-worm wheel reduction gearing E to an output coupled to an extension of the wheel slide feed screw of the grinder, such wheel slide also being positionable by conventional hand wheel control F, to adjust the effective relative setting of grinder wheels G and thereby the effective completed part size.

Referring to FIGS. 2 and 5, parts which have been discharged from the grinder roll down the inclined chute 101 where they are arrested in their travel by stationary wall 102, the last part resting on the top end 103 of an escapement feed arm 104 pivoted at 105 to brackets 106 mounted on stationary frame 107, the arm 104 being urged by tension spring 108 to a position limited by engagement of a cam follower 109 mounted on the arm 104 with a cam 110 driven by suitable reduction gearing, mounted by brackets 111 on the frame, through a drive coupling 112 and three-phase electric part feed motor 113. Upon each revolution of the cam 110, a rise 114 thereon actuates the escapement feed arm 104 to permit an additional part to drop onto the feed track 115 associated with the gauging mechanism A and when the arm 104 returns to the position shown after the rise 114 has passed cam follower 109, the parts on the track 115 are advanced to a position moving a new part 100 under the gauge actuating gauge arm 116 while the previously gauged part is moved onto and rolls down an inclined sorter chute 117 where, with reference to FIG. 4 it is guided down a center chute 118 if the part is onsize within predetermined tolerance limits, or where it is directed by either of the solenoid operated gates 119 to oversize or undersize chutes 120 depending on whether the part is oversize or undersize in excess of such predetermined limits. Each advance movement of the parts momentarily closes limit switch LS3.

In order to coordinate the operation of the sorting gates 119 with the feed arm 104, a pair of limit switches LS1, LS2 (FIG. 2) are actuated throughout a predetermined fraction of the cycle of cam 110 by an auxiliary cam element 121 secured to the side thereof. The closing of limit switch LS2 initiates actuation of one of the gate solenoids if an adequate sorting signal is present (later described in detail) while closing of the limit switch LS1 establishes a holding circuit for retaining either gate in a sorting position for a predetermined time after an oversize or undersize part has left the gauge head, as determined by the length of the cam element 121, and for a sufficient period to permit the part to roll down the sorting chute and to be shunted to a corresponding off-size chute whereupon limit switch LS1 is released and the gate 119 returns to its normal position as shown.

With reference to FIGS. 5 and 6, the gauge head is suitably secured to a transverse plate 122 adjustably mounted between uprights 123 on a stationary mounting pad 124. A pair of clamp screws 125 on either side passing through slotted apertures 126 in the uprights 123 and threadedly engaging the plate 122 serve to adjustably position the gauge head at a proper height relative to the bottom guide track 115. Extending between a pair of side guides 127 and on bottom guide 128 mounted on the base 124, side and bottom guide pads 129, 130, constructed of a wear resistant material, preferably tungsten carbide, are secured to the side and bottom guides 127, 128 and accurately position production parts 100 under a wear resistant gauge tip 131, preferably made of tungsten carbide, clamped by screw 132 in the arm 116 which is adjustably secured to an arm mount portion 133 in one of the side guides 127 by a pair of screws 134 passing through slotted apertures 135 in the arm mount. A necked portion 136 permits the arm to deflect as parts are pushed under the tip 131, the upper end of such tip registering against the face point 137 at the lower end of gauge shaft 138 (FIG. 7) passing through a retainer 139 and bushing 140 threadedly secured in the lower end of the gauge case 141.

With reference to FIGS. 7, 8 and 9, the shaft 138 is threadedly connected to a frame 142 resting in its lowermost position on pins 143 extending from the body 158, such frame being suspended at its lower corners and at the upper ends of its arms 147 by leaf springs 148 suitably secured to the body 158. The frame is also connected by leaf spring 144 to arm 146 which is in turn connected by leaf spring 145 to the body 158 whereby displacement of the gauge shaft 138 will result in amplified movement of the outer end of arm 146 to which is secured through stem 149 the variable differential transformer core 150 extending within transformer windings 151 seated in plastic housing 152 adjustably positioned by screw 153 along interengaging guideways 154, 155, the surfaces of which are maintained in contact during adjustment by springs 156 and locked in stationary relationship by clamp screw 157.

Neutral adjustment of the electrical signal derived from the differential transformer in response to part size deviation from a nominal size is effected with a master part under the gauge through adjustment screw 153. Such signal, suitably amplified by electronic circuits hereinafter described, is employed to control the direction and speed of the servo motor-tachometer generator set C which in turn drives through suitable reduction gearing, as best shown in FIGS. 10 and 11, the lead screw for adjustment of grinding wheel position in order to continuously correct for any error detected by the differential transformer of the gauge head. Since only minute adjustments in the lead screw position are required relative to the speed of the servo motor, a large order of reduction in the drive between the servo motor and the grinder lead screw is required. This is effected through a reduction from a small spur gear 200 on a motor output shaft to a large gear 201 which in turn drives the input of the differential speed reducer D (providing in itself a speed reduction in the order of 2000 to 1) the output of which drives a worm 202 and worm wheel 203 directly coupled to a lead screw extension 204 for driving the grinder wheel lead screw 205. By this means, a desired overall reduction, which in the present embodiment is in the order of 800,000 to 1, may be readily obtained.

Where, as in the present embodiment, the control is adapted to provide two directional drive for adjustment of the grinder wheel slide, it is desirable to incorporate means for minimizing backlash in the gearing, for example, by employing a split worm wheel 203, spring tensioned to take up clearance between the worm and worm wheel teeth and by fixing the worm 202 against axial movement.

From the above description, it will be understood that the electronic circuit for the embodiment disclosed in FIGS. 1–11 serves three main functions under the control of a continuous electrical signal provided by the linear variable differential transformer transducer head, the magnitude of which signal is proportional to the deviation of a part under the gauge head from a nominal size and the phase of which is 180 degrees different for an oversize part from that of an undersize part. Such signal, suitably amplified, is employed primarily to control the direction and speed of the two-phase servo motor adapted to adjust part size through positioning of the grinding wheel; the contol signal derived from part size deviation is also employed to actuate sorter solenoids to operate gates directing any parts which may be oversize or undersize beyond pre-determined limits to separate chutes thereby effecting an automatic sorting operation; and a visual meter is also actuated under the control of the part size deviation signal in order to provide the operator of the machine with an automatic visual check on the size of the parts running through the gauge head for purposes of making initial manual adjustments in the grinder setting as well as for periodic checking of the performance of the control.

While the electronic circuits for translating the differential output of the present differential transformer transducer into amplified power circuits for driving the servo motor and operating the sorter solenoids and visual meter involve standard electronic components and circuit principles known to the art, and while such circuits may be substantially varied with respect to detailed components and arrangements to meet individual requirements for various applications of the control system, a typical complete circuit is disclosed in the drawings in order to fully illustrate a suitable electronic circuit for meeting the typical requirements of the present application.

Referring to the electrical diagram of FIG. 12, conventional 440 volt, 60 cycle, three-phase line power operates the feed motor for moving parts through the gauging mechanism whenever the line contactor M1 is energized. A three-to-two-phase connection utilizing transformers T1 and T2 supplies two-phase control power. Transformer T2 supplies a voltage shifted in phase 90 degrees from the control voltage for energizing the servo motor reference winding. Transformer T3 provides voltage for use in the magnetic amplifier circuit, and rectifier X1 provides a source of direct current for actuating sorter solenoids.

Referring to FIG. 13, two-phase control power led in at contacts 10 and 11 is reduced to low voltage control power by transformer T301 including a source of low voltage direct current provided by rectifier V301.

With reference to FIG. 16, control voltage from the control power chassis is supplied to the primary winding of the linear variable differential transformer of the gauge head. Displacement of the movable core in this transformer produces a differential control signal voltage across its secondary winding, the magnitude of which is proportional to the displacement and the phase of which, with respect to the excitation voltage impressed across the primary winding, is dependent upon whether the part is oversize or undersize. As hereinafter described in detail, such signal voltage deriving from part deviation from nominal size, after pre-amplification in the circuit shown in FIG. 17, controls the actuation of the sorter and meter through the circuits shown in FIG. 18 and after further magnetic amplification in circuit shown in FIG. 14, controls actuation of the servo motor for effecting automatic adjustment of wheel position.

Referring to the pre-amplifier circuit shown in FIG. 17, the signal output voltage is applied to a resistance capacitance phase shifting circuit (R101, R102, C101, C102) which shifts the phase sufficiently to correct for a considerable phase shift occurring within the differential transformer. If the transformer is so connected that an oversize part produces an inphase voltage then an undersize part produces a voltage 180 degrees out of phase with the excitation voltage. The output voltage of the phase shifting circuit is then amplified by two stages of alternating current pentode amplifiers (V101, V102) having an unfedback gain of approximately 10,000 and direct coupled to the input of a triode cathode follower impedance matching stage (V103a). Stabilization and adjustable gain are provided in the pentode amplifiers by means of voltage feedback from the second stage to the first through a resistance capacitance network (C104, R112) and by cathode degeneration (R103, R109).

From the cathode follower stage the signal is distributed to sorter and meter circuits and a magnetic amplifier circuit. The output signal to the sorter and meter circuit passes directly from the cathode of tube V103a through contact 102, while such signal is coupled through an adjustable potentiometer R120 to a stage of cathode degeneratively stabilized triode amplification (V103b) the output of which is transformer coupled (T101) to a phase sensitive triode demodulator (V104a, V104b). The demodulator supplies current to the control winding of a phase reversible magnetic amplifier (FIG. 14, T401) which is connected to the control winding of the two-phase servo motor. The magnetic amplifier transformer circuit is preferably designed to saturate at a signal voltage corresponding to a pre-determined part size deviation, e.g. plus or minus .0005 inch, so as to avoid overcorrection from grossly offsize parts.

As previously mentioned in connection with FIG. 12, a voltage shifted in phase 90 degrees from the control voltage by means of a three-phase to two-phase transformer connection is impressed across the servo motor reference winding (FIG. 16) and an alternating current tachometer generator driven directly by the servo motor shaft supplies a voltage proportional to motor speed which is introduced into the input circuit of the triode amplifier (V103b) 180 degrees out of phase with the signal voltage. The function of this feedback voltage is to stabilize the magnetic servo amplifier and to effect a motor speed proportional to the differential transformer output.

Referring now to the sorter and meter circuits shown in FIG. 18, the signal from the cathode follower stage coming in through contact 1 of the sorter and meter chassis 200 is transformer coupled (T201) to a dual diode phase sensitive demodulator V203, the direct current output of which is proportional to the unbalance signal existing at the output of the differential transformer. This D.C. voltage is applied to a galvanometer M1 (FIGS. 1 and 15) to give a visual indication of the deviation of part size from nominal, a rheostat R219 is provided in series with the meter so that its sensitivity may be adjusted and a large capacity capacitor C205 is connected in parallel with the meter to provide an averaging function.

Considering now the sorting circuit, the signal from the cathode follower stage of the pre-amplifier is fed through an adjustable potentiometer R202 into a stage of phase inversion consisting of a dual triode (V201a, V201b), the outputs of which are coupled through adjustable potentiometers (R207, R212) to the inputs of a phase sensitive demodulator stage, consisting of a dual triode V202 operating sensitive relays (CR201, CR202). These sensitive relays operate rotary solenoids (FIG. 16) to position gates according to the size signal received from the differential transformer. Adjustments to provide for sorting parts to various tolerances are provided by the adjustable potentiometers. Those coupling the phase inverter to the demodulator (R207, R212) are used to set the individual over and undersize limits while the one coupling the pre-amplifier to the phase inverter (R202) is used to adjust both the over and undersize limits equally and simultaneously. An adjustable potentiometer R216 common to both triodes of the phase sensitive demodulator V202 is also provided. This potentiometer serves to balance any unbalanced current in the relay coils due to differences between the coils and triodes.

As previously described, two limit switches (LS1 and LS2, FIG. 2) work in conjunction with the sorter to provide proper timing of the sorter with respect to part motion.

Inter-relation of the various electronic circuits and related control elements is illustrated in the interconnection diagram of FIG. 16 wherein the boxed contact numbers correspond to those shown in the respective component circuits (FIGS. 12, 13, 14, 15, 17, and 18).

*Operation*

When the start push button PB1 is depressed (FIGS. 1, 12 and 15) a circuit is established through relay TD1 which is maintained by contacts TD1 (until the stop push button PB2 is depressed) which in turn establish a circuit for the part feed motor contactor M1a causing parts to be fed through the gauging mechanism by feed motor 113 (FIG 2), cam 110 and escapement feed arm 104. As long as parts continue to flow to the gauge mechanism from the grinder (operated by separate motor controls not shown) the periodic closing of limit switch LS3 energizes time delay relay TD2 which maintains the relay contact TD2A closed together with the circuit to the reference winding of the servo motor, such circuit being interrupted whenever stoppage of part flow permits relay TD2 to time out thereby interrupting control operation of the servo motor during such period.

Control power supplied by transformer T1 (FIG. 12) passes to the control power circuit (FIG. 13) where it is stepped down by secondary transformer winding T301 and then applied to the primary winding of the linear variable differential transformer (FIG. 16) the core of which (150, FIG. 7) is displaced in response to part size deviation through contact tip 131 (FIG. 5), gauge tip 137, gauge shaft 138 (FIG. 7), and mechanical amplification arm 146. Differential voltage from the secondary windings of the differential transformer, the amplitude of which is proportional to part deviation from a nominal size and having phases 180 degrees apart depending on whether the part is over or under nominal size (either phase being 90 degrees apart from the servo motor reference winding phase), passes to the pre-amplifier circuit (FIG. 17), the magnetic amplifier circuit (FIG. 14) and through the normally closed contacts of the control station push button PB3 (FIGS. 15 and 1) to the control phase winding of the two-phase servo motor as shown in FIG. 16. Manual depression of push button PB3 disconnects the signal circuit and supplies the control phase of the servo motor with relatively high unmodulated voltage from transformer T1 for relatively fast manual "jogging" control, reversible through switch SW1. The tachometer generator driven directly by the servo motor provides a negative feedback signal to the pre-amplifier circuit to stabilize the magnetic servo amplifier and to effect a motor speed proportional to the differential transformer output. The servo motor C (FIG. 10) drives through reduction gearing D, E to an extension of the feed screw 205 of the grinder wheel slide thereby effecting an adjustment proportional to and in a direction controlled by part size deviation.

The control signal in the pre-amplifier circuit (FIG. 17) which is proportional to part size deviation is directly applied to the sorter and meter circuits (FIG. 18), the output of the meter circuit passing to the galvanometer M1 (FIGS. 1 and 15), and the output of the sorter circuit operating sensitive relays CR201 or CR202 controlling rotary solenoid gates 119 (FIG. 4) if an adequate oversize or undersize control signal is established by a part under the gauge head, the cam operated limit switch LS2 (FIGS. 2 and 16) controlling the initial establishment of a sorting signal while the part to be sorted is under the gauge head while the limit switch LS1 provides a holding circuit after such part has left the gauge head for a sufficient period to permit it to roll down the sorter chute 117 and to be shunted by one of the gates 119 into an oversize or undersize chute 120 whereafter limit switches LS1 and LS2 will be released by cam 121.

The final adjustment rate per part should be of a small order relative to part size deviation in order to minimize shifting of the scatter band in response to any individual part and to permit the control to effectively integrate the deviations of a large number of parts in producing any substantial correction. Experience has shown that a maximum rate of adjustment equal to approximately ten times the rate of wheel wear produces a highly satisfactory result with no perceptible enlargement of the normal scatter band and with the mean of such scatter band exactly on the nominal size. No other known control has been capable of such results.

Modification

It will be understood that the general control system disclosed herein lends itself to numerous alternatives in the individual control components as well as modifications in the specific arrangement of such components. For example, as shown in FIG. 20, the source of a differential energy signal increasing with part size deviation from a nominal size may be a pair of fluid pressure jets the discharge opening of one varying with part size while the discharge opening of the other is adjusted to correspond to a pre-determined nominal part size. The resulting differential air pressure from offsize parts may be applied to a differential pressure transducer, such as the core of a transformer biased to a neutral position and displaceable therefrom in response to differential air pressure. The differential electrical output of such transformer may be suitably amplified, applied to a servo motor driving a reduction gear train for adjustably positioning a machine slide as in the main embodiment disclosed herein.

Again, as illustrated in FIG. 21, an underlapped 4-way proportional control valve directly positioned and responsive to part size deviation may be employed to direct a differential flow of air or hydraulic fluid from a source of pressure to or from opposite sides of a two-way air or oil motor adapted to adjust a machine slide, differential orifice passages regulated by valve movement in response to part size deviations providing a velocity of fluid flow and adjustment drive increasing with part size deviation and responsive in direction to oversize and undersize parts.

FIG. 22 illustrates another modified form of proportional continuous size control wherein an electrical voltage proportional to part deviation is amplified, as in the main embodiment, and applied to a torque motor which strokes a servo valve giving a flow to the motor and consequent feed rate.

In the modified system of FIG. 23, an amplified electrical signal controls a voltage responsive timer which energizes a constant speed motor for a *time* proportional to part size deviation.

It will be noted that in each of the above modifications, an adjustment proportional to part size deviation is effected, and, in the absence of a fixed bias signal, no adjustment is effected while perfect parts are being gauged. In the modification shown in FIG. 24, the output of a servo motor responsive to part size deviation is adapted to vary the reduction ratio and direction of rotation of a variable speed reducer whose input shaft is driven at a constant speed by an electric motor. Thus, the output of the variable speed reducer has a velocity proportional to the amount of part size deviation and in a corresponding direction. When the part being gauged is exactly onsize, there is no output velocity from such unit. The output shaft of the first variable speed reducer is used to change the reduction ratio and direction of rotation of a second variable speed reducer, whose input shaft is also driven at a constant velocity by the same electric motor. With the controlling shaft turning at a constant velocity for an offsize part, a constant acceleration of the output shaft results providing an acceleration or deceleration of the adjustment output shaft proportional to the amount the part being gauged is over or undersize.

It will be understood that while preferred embodiments of the present system comprehend a response adjustment, as well as an energy signal which is unrestricted in sensitivity and which is proportional to the magnitude of part size deviation, a less efficient but feasible modification of the present system may be employed wherein the adjustment is made in fixed increments by a step jogger mechanism whenever a discernible signal is produced by gauging mechanism having unrestricted sensitivity to part size deviations, or whenever the cumulative effect of successive discernible signals having unrestricted sensitivity to part size deviations reaches a pre-determined cumulative unbalance. Such modification of the system is illustrated in FIG. 25 wherein a differential valve responsive to part size deviation directs fluid pressure to either side of a fluid pressure actuated piston depending on whether the gauged part is oversize or undersize. Step jogger limit switches, in this case responsive to a pre-determined displacement of the piston, produce a fixed step adjustment whenever cumulative movement of the piston from a neutral position resulting from the cumulative flow responsive to successive offsize parts produces a pre-determined unbalance displacement of the piston. Whenever the step jogger is actuated, a fixed time delay relay is also energized to actuate solenoid valves to an exhaust position permitting the neutral biased piston to return to neutral position.

The significant distinction between this modification and prior step jogging adjustment systems lies in utilizing the cumulative effect of integration of all offsize part information in producing the step adjustments rather than ignoring or discarding information as to parts which are offsize within predetermined established tolerance limits.

While a particular embodiment and several modifications of the present invention have been disclosed herein, it will be understood that numerous other modifications in the particular components employed as well as the arrangement of such components to meet requirements for different applications of the control system might be resorted to without departing from the scope of the present invention as defined in the following claims. In such claims, the term "unrestricted sensitivity," in defining means for producing an energy signal responsive to part size deviation from a pre-determined nominal size and means responsive to such energy signal for actuating adjustable means, shall be construed as unrestricted in response to every deviation from a nominal size distinguishing from controls adapted to produce adjustment only in response to deviation exceeding a pre-determined limit range.

We claim:

1. A uniform part size control system for a production machine having adjustable means for varying completed part size, characterized by means for gauging completed parts, means for producing distinguishable energy signals in response to deviations of the completed parts on either side of an exact nominal size, said last means being characterized by having a single null balance point corresponding to said nominal size on either side of which an energy signal is produced, and means responsive to said distinguishable energy signals for actuating said adjustable means, said last means being characterized by means for integrating all energy signals to produce required adjustment.

2. A uniform part size control system for a production machine having a stock removing tool element subject to appreciable wear which affects part size during a production run and adjustable means for varying completed part size, characterized by means for gauging completed parts, means responsive to said gauging means for producing an energy signal increasing with the magnitude of deviation of part size from a pre-determined nominal size and means responsive to said energy signal for actuating said adjustable means to an extent increasing with the magnitude of said energy signal.

3. A uniform part size control system for a production machine having a stock removing tool element subject to appreciable wear which affects part size during a production run and adjustable means for varying completed part size, characterized by means for gauging completed parts, means responsive to said gauging means for producing an energy signal increasing with the extent of deviation of a gauged part from a pre-determined nominal size and distinguishable as to the direction of deviation, and means responsive to said energy signal for actuating said adjustable means to an extent increasing with the magnitude of said energy signal and in a direction depending upon the direction of deviation of gauged part size from nominal size.

4. A uniform part size control system for a production machine having a stock removing tool element subject to appreciable wear which affects part size during a production run and adjustable means for varying completed part size, characterized by means for gauging completed parts, means responsive to said gauging means for producing a continuous energy signal whenever a gauged part deviates from a pre-determined nominal size, said energy signal continuing during the period of part gauging, and means responsive to said energy signal for continuously actuating said adjustable means during the period that said energy signal prevails.

5. A uniform part size control system for a production machine having a stock removing tool element which wears appreciably during a production run and adjustable means for varying completed part size, characterized by means for gauging completed parts, means responsive to said gauging means for producing an energy signal increasing with the extent of deviation of a gauged part from a pre-determined nominal size, means responsive to said energy signal for actuating said adjustable means to an extent increasing with the magnitude of said energy signal, and means for effectively establishing an upper limit to the magnitude of adjustment whereby undue influence of grossly offsize parts which are not representative of the production run may be avoided.

6. A uniform part size control system for a production machine having a stock removing tool element subject to appreciable wear which affects part size during a production run and adjustable means for varying completed part size, characterized by means for gauging completed parts, differential means responsive to said gauging means for producing an energy signal increasing with the extent of deviation of a gauged part from a pre-determined nominal size and distinguishable as to the direction of deviation, means responsive to said energy signal for actuating said adjustable means to an extent increasing with the magnitude of said energy signal and in a direction depending upon the direction of said deviation, and means for adjusting said differential means to a neutral position at which no effective energy signal will result when a part corresponding exactly to said pre-determined nominal size is gauged.

7. A uniform part size control system for a production machine having a stock removing tool element subject to appreciable wear which affects part size during a production run and adjustable means for varying completed part size, characterized by means for gauging completed parts, differential means responsive to said gauging means for producing an energy signal increasing with the extent of deviation of a gauged part from a pre-determined nominal size and distinguishable as to the direction of deviation, means responsive to said energy signal for actuating said adjustable means to an extent increasing with the magnitude of said energy signal and in a direction depending upon the direction of said deviation, and means for adjusting said differential means to a neutral position at which no effective energy signal will result, such neutral position corresponding to an offsize part such as to establish a bias energy signal when a part corresponding exactly to said nominal size is being gauged whereby a machine adjustment responsive to said energy signal corresponding to the average rate of tool wear may be effected even when parts which are exactly on nominal size are being gauged.

8. A control system as set forth in claim 3 including visual gauge means responsive to the magnitude of said energy signal and responsive to the direction of deviation of part size.

9. A control system as set forth in claim 3 including manual control means for operating said means responsive to said energy signal in either a fast forward or fast reverse direction.

10. A control system as set forth in claim 3 wherein said means for producing an energy signal includes a linear variable differential transformer adapted to produce a differential alternating control voltage increasing with part size deviation and 180 degrees out of phase as between oversize and undersize deviations.

11. A control system as set forth in claim 3 wherein said means for producing an energy signal includes a linear variable differential transformer adapted to produce a differential alternating control voltage increasing with part size deviation and 180 degrees out of phase as between oversize and undersize deviations, an electronic circuit for amplifying said signal control voltage, and a two-phase servo motor having a reference winding, and a control winding, said control winding being energized by said amplified signal control voltage.

12. A uniform part size control system for a production machine having a stock removing tool element subject to appreciable wear which affects part size during a production run and adjustable means for varying completed part size, characterized by means for gauging completed parts, means responsive to said gauging means for producing an energy signal increasing with the extent of deviation of a gauged part from a pre-determined nominal size and distinguishable as to the direction of deviation, means responsive to said energy signal for actuating said adjustable means to an extent increasing with the magnitude of said energy signal and in a direction depending upon the direction of deviation of gauged part size from nominal size, and means for producing a feedback signal responsive to the extent of the adjustment adapted to oppose said energy signal.

13. A control system as set forth in claim 3 including means for interrupting the actuation of said adjustable means in response to an interruption of production.

14. A control system as set forth in claim 4 including means for successively feeding completed parts through said gauging means, said last means being adapted to cause each part to remain in a static gauge actuating position for a major portion of the complete feed cycle time.

15. A uniform part size control mechanism for a production machine having a stock removing tool element subject to appreciable wear which affects part size during a production run and an adjustable means for varying completed part size, said mechanism being characterized by means for gauging completed parts as discharged from said machine, means responsive to said gauging means for producing an energy signal increasing with the extent of deviation of a gauged part from a pre-determined nominal size, means for continuously actuating said adjustable means, and means responsive to said energy signal for modifying the rate of movement of said adjustable means in accordance with the magnitude of said energy signal.

16. A uniform part size control system for a production machine having a stock removing tool element subject to appreciable wear which affects part size during a production run and adjustable means for varying completed part size, characterized by means for gauging completed parts, means responsive to said gauging means for producing an offsize part energy signal, means for continuously actuating said adjustable means, and means responsive to said energy signal for modifying the rate of actuation of said adjustable means.

17. A control system as set forth in claim 3 wherein said means for gauging completed parts includes differential fluid pressure jet means having an effective orifice opening varying with part size deviations.

18. A control system as set forth in claim 2 wherein said last means includes a constant speed motor engaged for adjustment drive for successive periods of time varying with the magnitude of deviation of successive part sizes from said pre-determined nominal size.

19. A uniform part size control system for a production machine having a stock removing tool element subject to appreciable wear which affects part size during a production run and adjustable means for varying completed part size in either direction, characterized by means for gauging completed parts, means responsive to said gauging means for producing a continuous energy signal whenever a gauged part deviates in either direction from a pre-determined nominal size, said energy signal being distinguishable as to direction of deviation and continuing during the period of part gauging, and means responsive to said energy signal for continuously actuating said adjustable means in a direction depending on said distinguishable energy signal during the period that said energy signal prevails.

References Cited in the file of this patent

UNITED STATES PATENTS

| | | |
|---|---|---|
| 1,891,662 | Booth et al. | Dec. 20, 1932 |
| 2,503,851 | Snow | Apr. 11, 1950 |
| 2,664,557 | Sargrove | Dec. 29, 1953 |
| 2,692,457 | Bindszus | Oct. 26, 1954 |
| 2,768,482 | Bindszus | Oct. 30, 1956 |

FOREIGN PATENTS

| | | |
|---|---|---|
| 89,285 | Switzerland | Sept. 16, 1921 |
| 241,247 | Switzerland | Feb. 28, 1946 |